(12) United States Patent
Kosuge et al.

(10) Patent No.: US 6,672,639 B2
(45) Date of Patent: Jan. 6, 2004

(54) VEHICLE REAR BODY STRUCTURE (75) Inventors: Masami Kosuge, Wako (JP); Hiroshi Ito, Wako (JP); Hiroyuki Isayama, Wako (JP); Takenobu Haga, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/155,365

(22) Filed: May 23, 2002

(65) Prior Publication Data

US 2002/0185881 A1 Dec. 12, 2002

(51) Int. Cl.$^7$ ............................................. B62D 43/00
(52) U.S. Cl. .................... 296/37.2; 296/187.11
(58) Field of Search ............... 296/37.2, 188, 296/187.11

(56) References Cited

U.S. PATENT DOCUMENTS 5,713,625 A * 2/1998 Takahasi et al.
6,231,097 B1 * 5/2001 Schell et al.
6,286,867 B1 * 9/2001 Braemig et al.
6,364,401 B1 * 4/2002 Kim

* cited by examiner

Primary Examiner—Dennis H. Pedder
(74) Attorney, Agent, or Firm—Merchant & Gould, P.C.

(57) ABSTRACT

A vehicle rear body structure is disclosed having a flat portion formed on a rear floor panel, a bottom portion of a spare tire resting concave portion lower in height than the flat portion, and a front wall connecting the flat portion and the bottom portion to one another and sloped downwardly rearwardly. A front wall reinforcing member for reinforcing the front wall is mounted along an inclined surface of the front wall. The front wall reinforcing member limits deformation of the front wall by guiding the spare tire along the inclined surface when the spare tire is moved forward. As a result, a distance between the front wall and a fuel tank disposed below the front wall and the flat portion is reduced for thereby enabling the fuel tank to have an increased volume.

5 Claims, 9 Drawing Sheets

VEHICLE REAR BODY STRUCTURE

FIELD OF THE INVENTION

This invention relates to a vehicle rear body structure configured to enable an increase in a volume of a fuel tank.

BACKGROUND OF THE INVENTION

Figure 10:
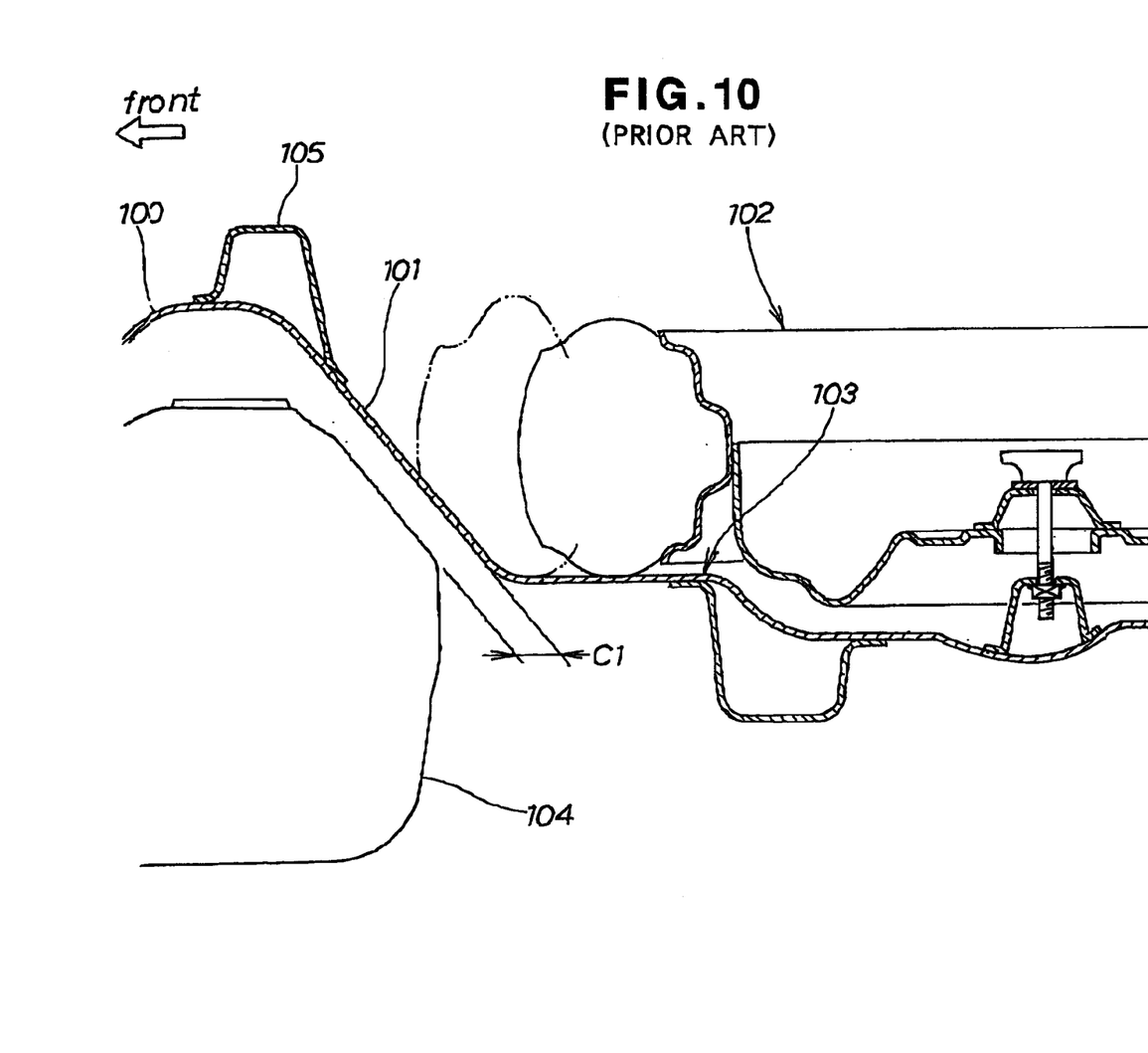
FIG. 10 is a schematic cross sectional view of a conventional vehicle rear body structure.

FIG. 10 hereof is a cross sectional view illustrating a conventional rear vehicle body structure which includes a rear floor panel 100 having a lowered rear portion (right side in the Figure), a slanted surface 101, and a spare tire resting area 103 for resting a spare tire 102 thereon. A fuel tank 104 is disposed downwardly and forwardly of the slanted surface 101. A rear floor upper cross member 105 is mounted to an upper part of the slanted surface 101.

In this arrangement, when the spare tire 102 is moved forward from the spare tire resting area by an external force exerted thereto from a rear side of the vehicle body and bumped against the slanted surface 101, the slanted surface 101 deforms by a horizontally directed pressing force of the spare tire 102 and comes close to the fuel tank 104. In order to prevent the slanted surface 101 from interfering with the fuel tank in such a case, a clearance C1 between the slanted surface 101 and the fuel tank 102 may be set to have a large value. However, such a large value of the clearance C1 results in a reduced volume of the fuel tank 102 and hence in smaller mileage.

SUMMARY OF THE INVENTION

The present invention contemplates an improvement over such a vehicle rear body structure and provides a vehicle rear body structure which limits a slanted surface from being deformed while reducing a distance between the slanted surface and a fuel tank to allow the fuel tank to have an increased volume.

According to an aspect of the present invention, there is provided a vehicle rear body structure arranged to accommodate a spare tire, which structure comprises a floor nearest to a passenger compartment, a spare tire resting floor lower in height than the nearest-to-the-compartment floor, for resting a spare tire, a slanted surface interconnecting the floors and sloped downwardly rearwardly, and a reinforcing inclined plate mounted to the slanted surface for reinforcing the same, whereby, when the spare tire is moved forward, the spare tire is guided by the reinforcing inclined plate toward an upper area of the slanted surface.

Guiding the spare tire with the reinforcing inclined plate to the slanted surface enables the spare tire to be smoothly guided to the slanted surface. Further, reinforcing the slanted surface with the reinforcing inclined plate enables deformation of the slanted surface to be limited when the spare tire is brought into abutting engagement with the slanted surface and, hence, the spare tire can be reliably moved to the upper area of the slanted surface due to inclination of the slanted surface while enabling the distance between the fuel tank and the slanted surface to be reduced. Accordingly, it is possible for the fuel tank to have an increased volume.

Preferably, a sheet-like member is disposed between the reinforcing inclined plate and the spare tire. A coefficient of friction occurring between the sheet-like member and the reinforcing inclined plate is selected to be lower than that occurring between the tire portion of the spare tire and the sheet-like member. This allows the spare tire to easily smoothly slide on the reinforcing inclined plate while it is placed on the sheet-like member.

It is desirable that a cross member is additionally provided on the nearest-to-the-compartment floor and includes a reinforcement so that deformation of the cross member, which occurs when the spare tire is brought into bumping contact with the cross member, is limited, enabling smooth movement of the spare tire without interruption by the cross member.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENTS

Figure 1:
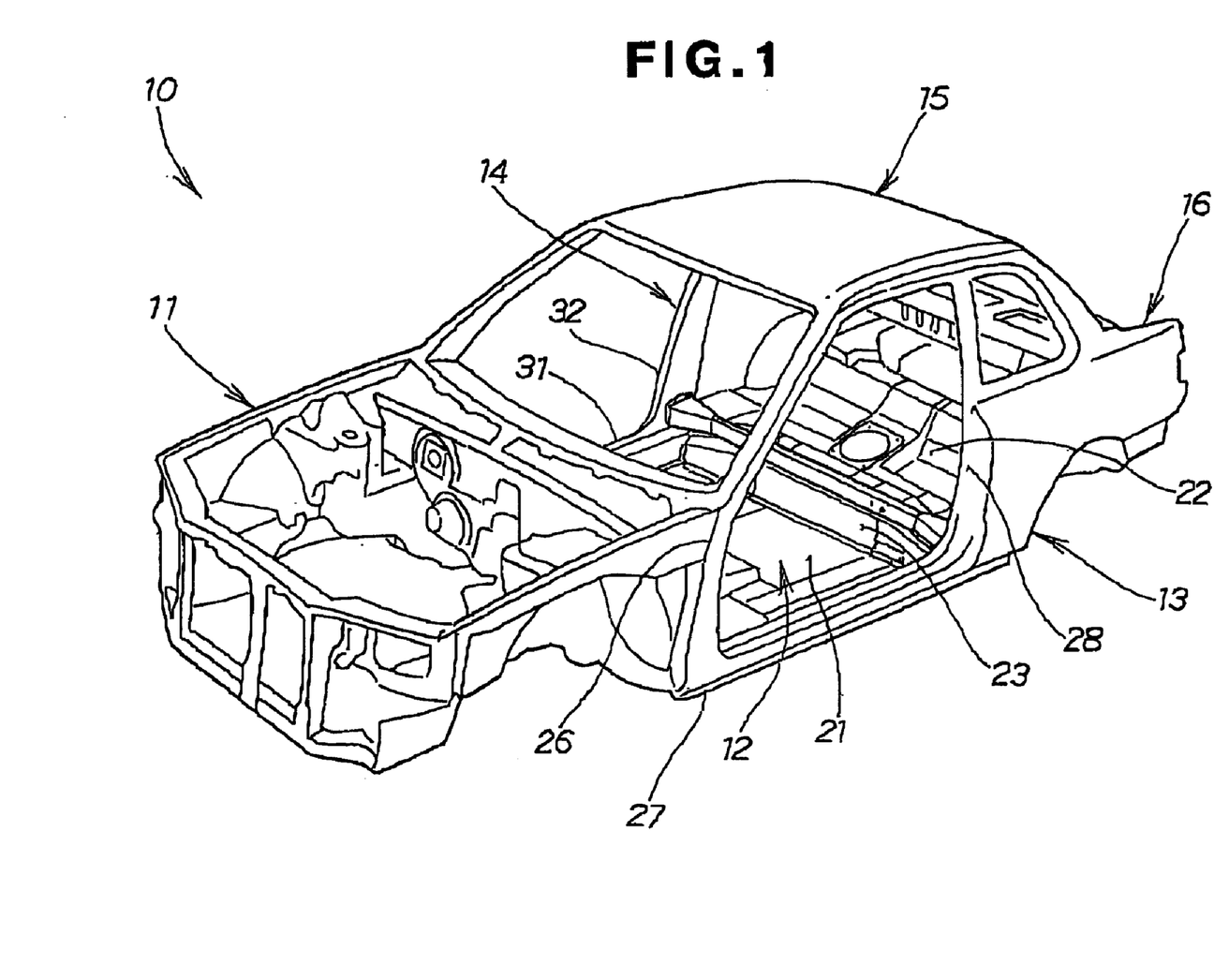
FIG. 1 is a perspective view of a vehicle body including a vehicle rear body structure according to the present invention.

Referring to FIG. 1, a vehicle body 10 is shown having components which include a frame structure composed of a front body 11 formed with an engine space to support an engine while bearing inputs form front suspensions, an under body 12 is formed rearwardly of the front body 11 to form a floor wall for a passenger compartment and a luggage compartment while receiving a fuel tank and a spare tire, etc., and bearing inputs form rear suspensions, side bodies 13, 14 which are upright at both sides of the under body 12 form side walls of the passenger compartment, a roof 15 bridging at upper portions of the side bodies 13, 14 form a roof component of the passenger compartment, and a rear body 16 forms the luggage compartment at a rear part of the under body 12.

The under body 12 is comprised of a front floor panel 21 which serves as the floor wall of the passenger compartment, a rear floor panel 22 which supports rear seats while serving as the floor wall of the luggage compartment, and a middle floor cross member stiffener 23 (member for reinforcing a middle floor cross member which is not shown) mounted to respective joined portions between the front floor panel 21 and the rear floor panel 22.

The side body 13 includes a front pillar 26 to which a door is mounted, a sill 27 mounted to a side portion of the under body 12 for enhancing body rigidity, and a center pillar 28 to which component parts for retaining a rear end of the door and for locking the door are mounted.

The side body 14 includes a sill 31 and a center pillar 32 in the same structure as the side body 13.

Figure 2:
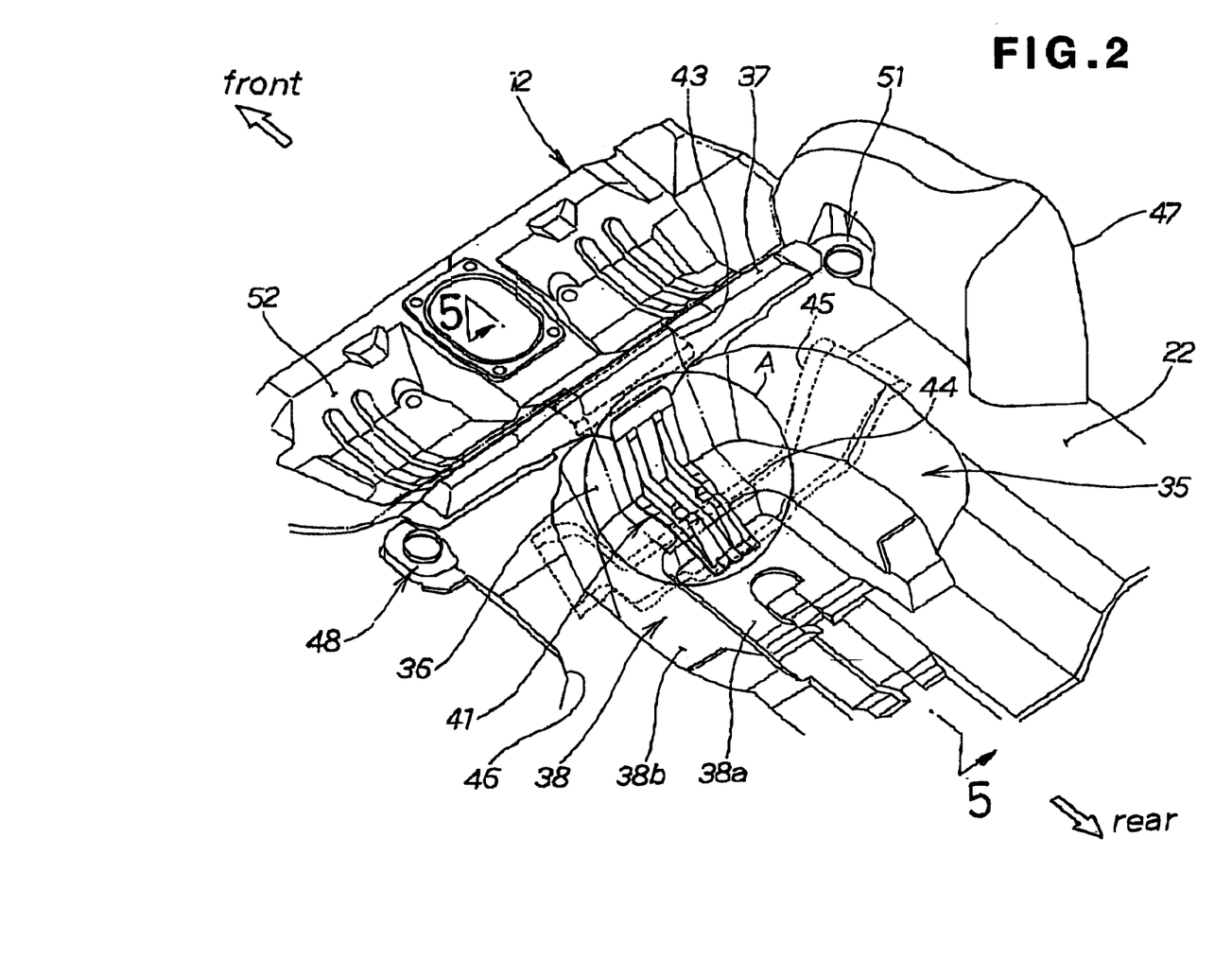
FIG. 2 is a perspective view illustrating the vehicle rear body structure.

Turning now to FIG. 2, a spare tire accommodation concave portion 35 is provided for accommodating a spare tire on the rear floor panel 22 at an area rearward of the under body 12. A rear floor upper cross member 37 (which is defined as a cross member in appended claims) is provided at an upper area of a front wall 36 which forms a slanted surface of the spare tire accommodation concave portion 35. A front wall reinforcing member 41 is mounted and serves as a guide member to guide the spare tire so as to allow the same to move toward the front wall 36, when the spare tire is exerted with an external force from a vehicle rear body area (with the vehicle rear body area being represented with a (rearward) white arrow whereas the vehicle body front area being represented by a (frontward) white arrow, with the same hereinafter) in an area between a bottom portion 38 (defined as a spare tire resting floor in appended claims and being comprised of a first bottom portion 38a and a second bottom portion 38b formed around a peripheral area, with an increased height, of the first bottom portion 38a) of the spare tire accommodation concave portion 35 and the front wall 36, while serving as a reinforcing inclined plate for reinforcing the front wall 36.

Here, reference numeral 43 denotes a reinforcement serving as a reinforcing member mounted inwardly of the rear floor upper cross member 37 to reinforce a central portion of the rear floor upper cross member 37; 44, a floor carpet serving as a sheet-like member extending from a front side of the rear floor panel 22; 45, a rear floor cross member located at a rear surface of the spare tire accommodation concave portion 35; 46, 47, rear wheel houses; 48, 51, damper mount portions to which upper ends of a rear wheel dampers are mounted; and 52, a rear seat rest area.

Figure 3:
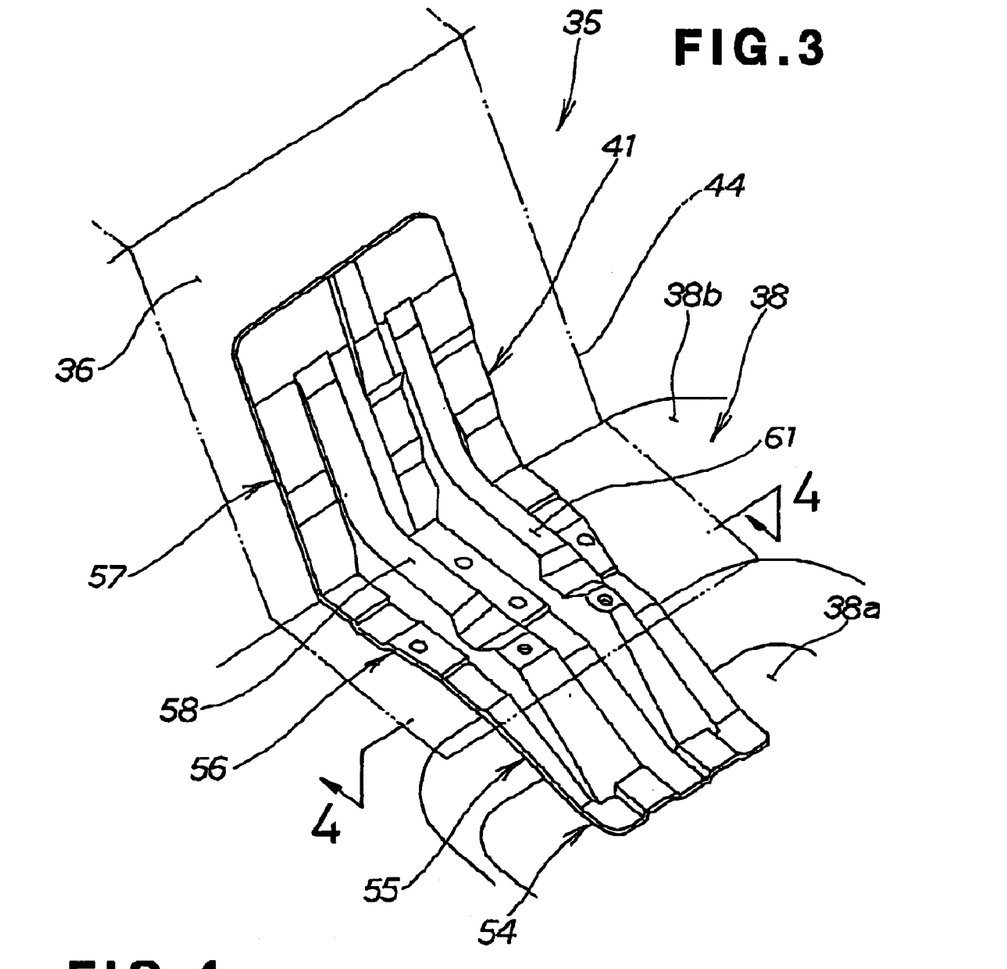
FIG. 3 is an enlarged view of portion A shown in FIG. 2.

In FIG. 3, the front wheel reinforcing member 41, which is formed by press forming a steel plate, includes components which are comprised of a rear distal end portion 54 which is held in abutting contact with the first bottom portion 38a of the spare tire accommodation concave portion 35, a first inclined portion 55 which extends forwardly and upwardly from the rear distal end portion 54, a horizontal portion 56 forwardly extending from a front end of the first inclined portion 55 along the second bottom portion 38b, and a second inclined portion 57 forwardly and upwardly extending from a front end of the horizontal portion 56 along the front wall 36, with two longitudinally extending lengthwise protruding portions 58, 61 being formed to be spaced from one another in a widthwise direction of the vehicle.

The lengthwise protruding portions 58, 61 acts as a rail for permitting smooth movement of the spare tire and functions to provide an increased rigidity of the front wall reinforcing member 41 per se.

Figure 4:
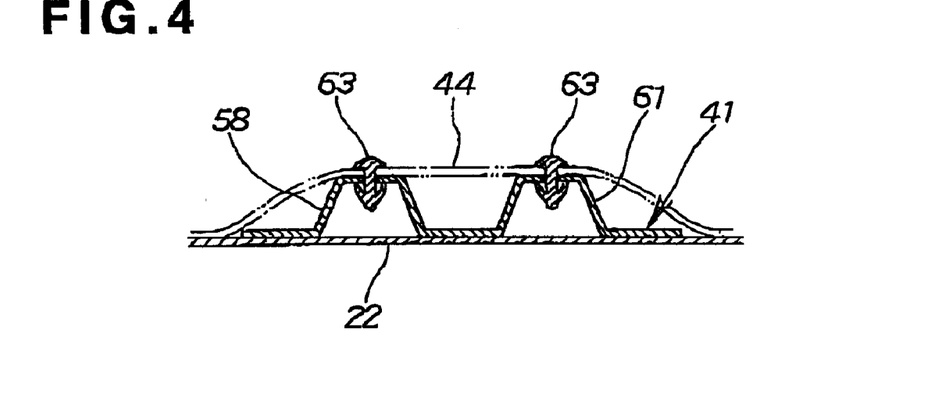
FIG. 4 is a cross sectional view taken along line 4—4 of FIG. 3.

FIG. 4 is a cross sectional view taken on line 4—4 of FIG. 3 and shows a condition in which the floor carpet 44 is placed on the front wall reinforcing member 41. Also, reference numerals 63, 63 denote fixture members for fixing the floor carpet 44 to the lengthwise protruding portions 58, 61 of the front wall reinforcing member 41.

Figure 5:
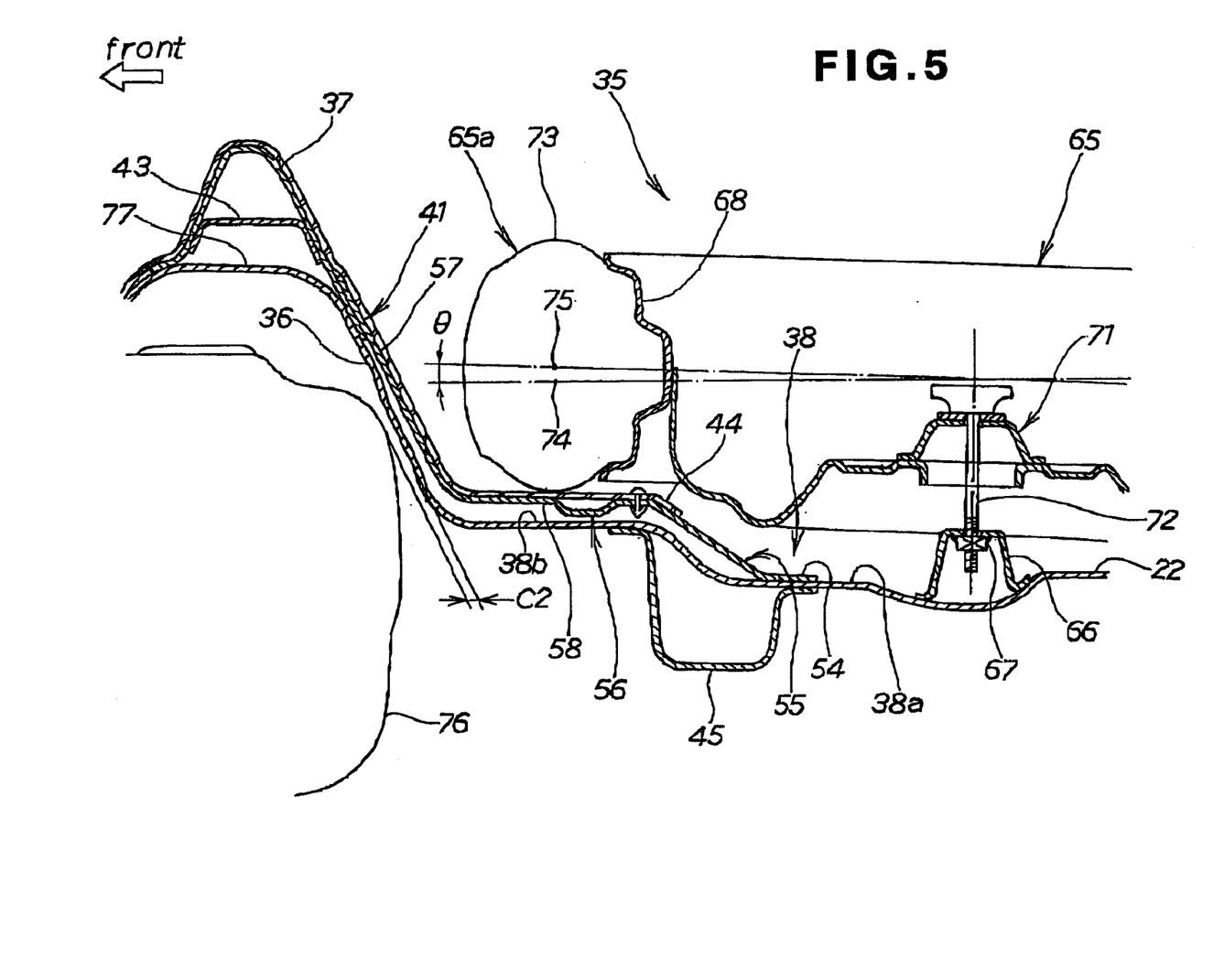
FIG. 5 is an enlarged cross sectional view taken on line 5—5 of FIG. 2.

FIG. 5 is a cross sectional view, taken on line 5—5 of FIG. 2, in which the floor carpet 44 is pictured in a solid line and a spare tire 65 is added.

The spare tire 65 is fixed to the spare tire accommodation concave portion 35 by mounting a bracket 66 to the bottom portion 38 of the spare tire accommodation concave portion 35, welding a nut 67 to the bracket 66 and screwing a thumb-bolt 72 to the nut 67 via a wheel press member 71 which urges a wheel 68 of the spare tire 65 such that a front portion 65a (front portion of the tire 73) is placed on the front wall reinforcing member 41 via a floor carpet 44 whereas a rear portion is placed on the bottom portion 38 under a condition wherein a rim center line 75, which is described at a center of a rim width of the wheel 68, is forwardly and upwardly inclined at a degree of θ with respect to a horizontal line 74.

The bracket 66, the nut 67, the wheel press member 71 and the thumb-bolt 72 described above are component parts which form the spare tire fixing member.

The angle of θ discussed above is determined so as to allow the spare tire 65 to further easily move upward along the second inclined portion 57 of the front wall reinforcing member 41 during forward movement of the spare tire 65.

In the figure, reference numeral 76 denotes a fuel tank, with a clearance between the rear floor panel 22 and the front wall 36 being assigned as C2 which is selected to have a smaller value than a clearance C1 shown in FIG. 10. Also, reference numeral 77 denotes a flat portion which is located rearward of and upward of the fuel tank 76 and formed in a flat shape formed on the rear floor panel 22 at an area between the damper mount portions 48, 51 (see FIG. 2) and which is closer to the vehicle compartment and defined in the appended claims.

Now, the operation of the vehicle rear body structure discussed above is described with reference to FIGS. 6 to 9. Also, in the figure, the spare tire fixing member by which the spare tire 65 is fixed to the spare tire accommodation concave portion 35 is omitted.

Figure 6:
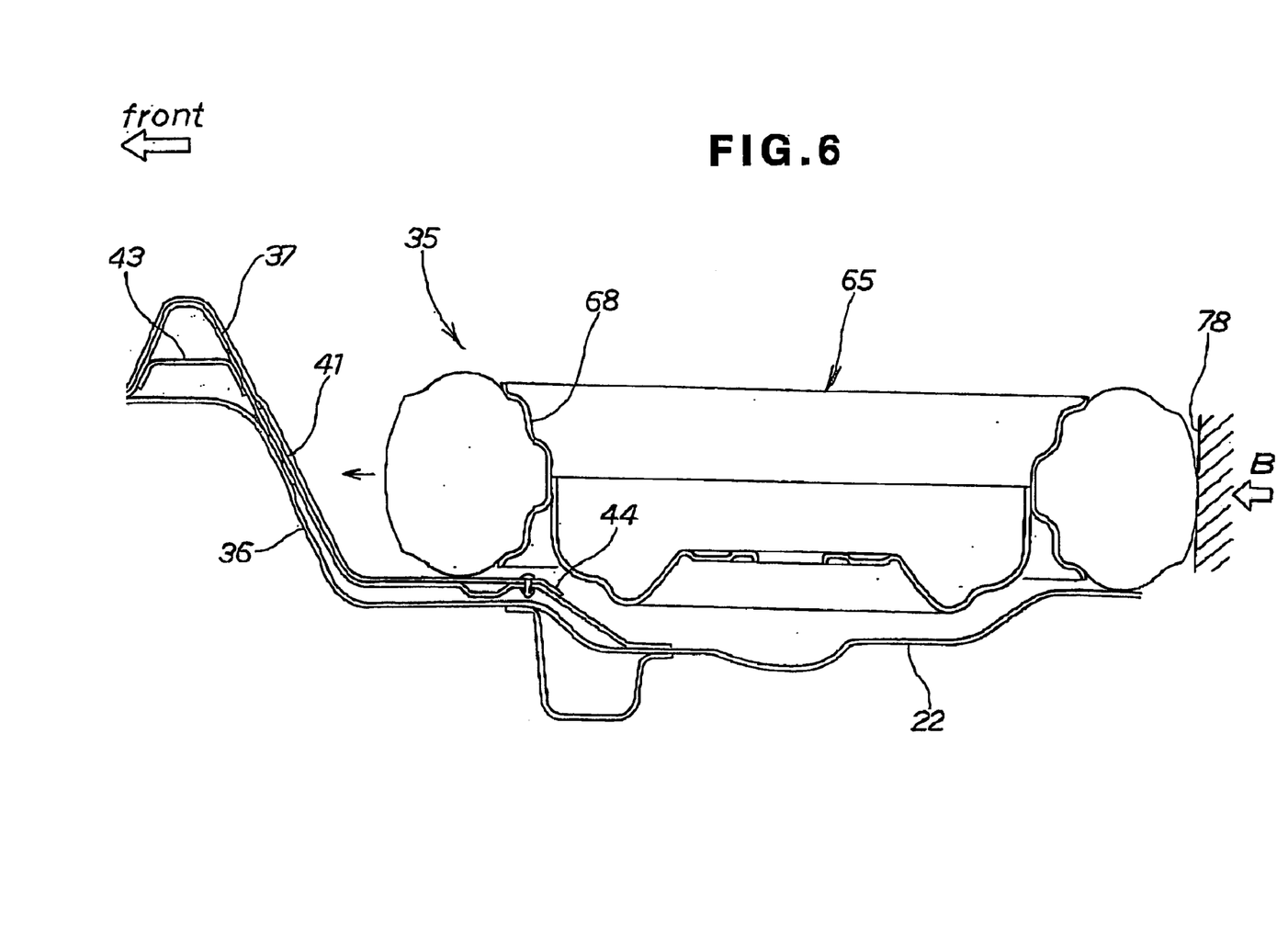
FIGS. 6 to 9 are schematic views illustrating a sequence of forward movements of a spare tire in the vehicle rear body structure according to the present invention.

In FIG. 6, for instance, if an external force is exerted from the vehicle rear body area to the spare tire 65 via the rear body rear wall 78 as shown by a white arrow B, the spare tire fixing member, which is not shown, is damaged while the spare tire 65 begins to move forward of the vehicle body as shown by the arrow.

Figure 7:
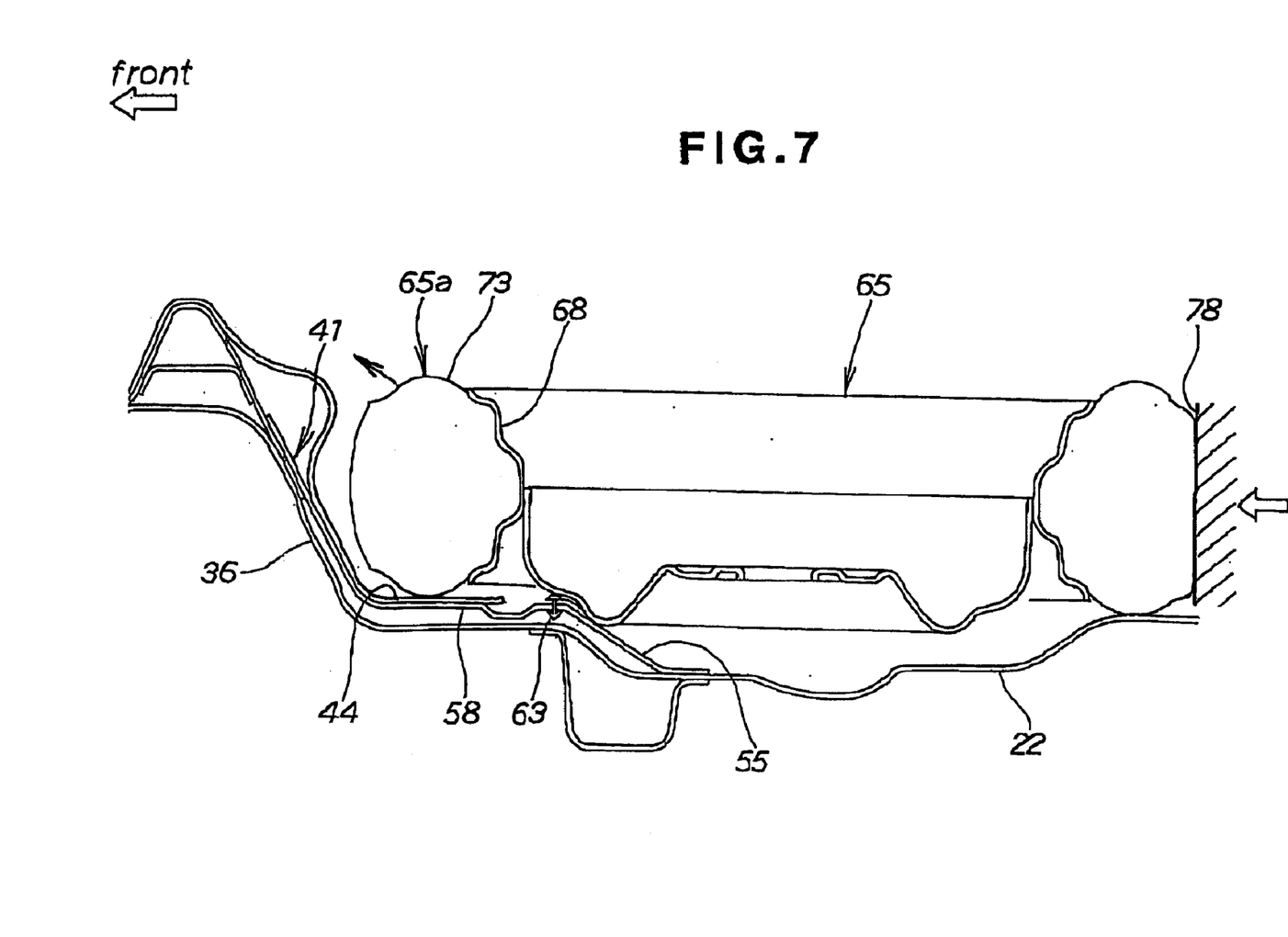

Under conditions shown in FIGS. 6 and 7, as the spare tire 65 moves forward of the vehicle body, due to the coefficient of friction between the tire 73 and the floor carpet 44 being greater than that between the floor carpet 44 and the front wall reinforcing member 41, the floor carpet 44 is caused to move forward together with the spare tire 65. As a result, a rear distal end portion of the floor carpet 44 secured to the front wall reinforcing member 41 by a fixing member 63 is torn, thereby causing a forward portion of the floor carpet 44 in front of the spare tire 65 to be fed forward to compel the forward portion to be separated from the front wall reinforcing member 41 to be brought into a floating condition.

In such a case, the presence of the fixing member 63 of the floor carpet 44 structured to be fragile or to easily come off the front wall reinforcing member 41 enables the floor carpet 44 to easily move together with the spare tire 65.

The wheel 68 of the spare tire 65 is brought into abutting engagement with the first inclined portion 55 of the front wall reinforcing member 41. As such, a front portion 65a of the spare tire 65 is moved forward of the vehicle body while being raised with the inclination of the first inclined portion 55. That is, the wheel 68 of the spare tire 65 moves forward of the vehicle body along the first inclined portion 55 of the front wall reinforcing member 41 as shown by the arrow. In such a case, since the spare tire 65 is forwardly raised at the angle of θ, it is possible for the spare tire 65 to be easily moved upward due to the first inclined portion 55.

Figure 8:
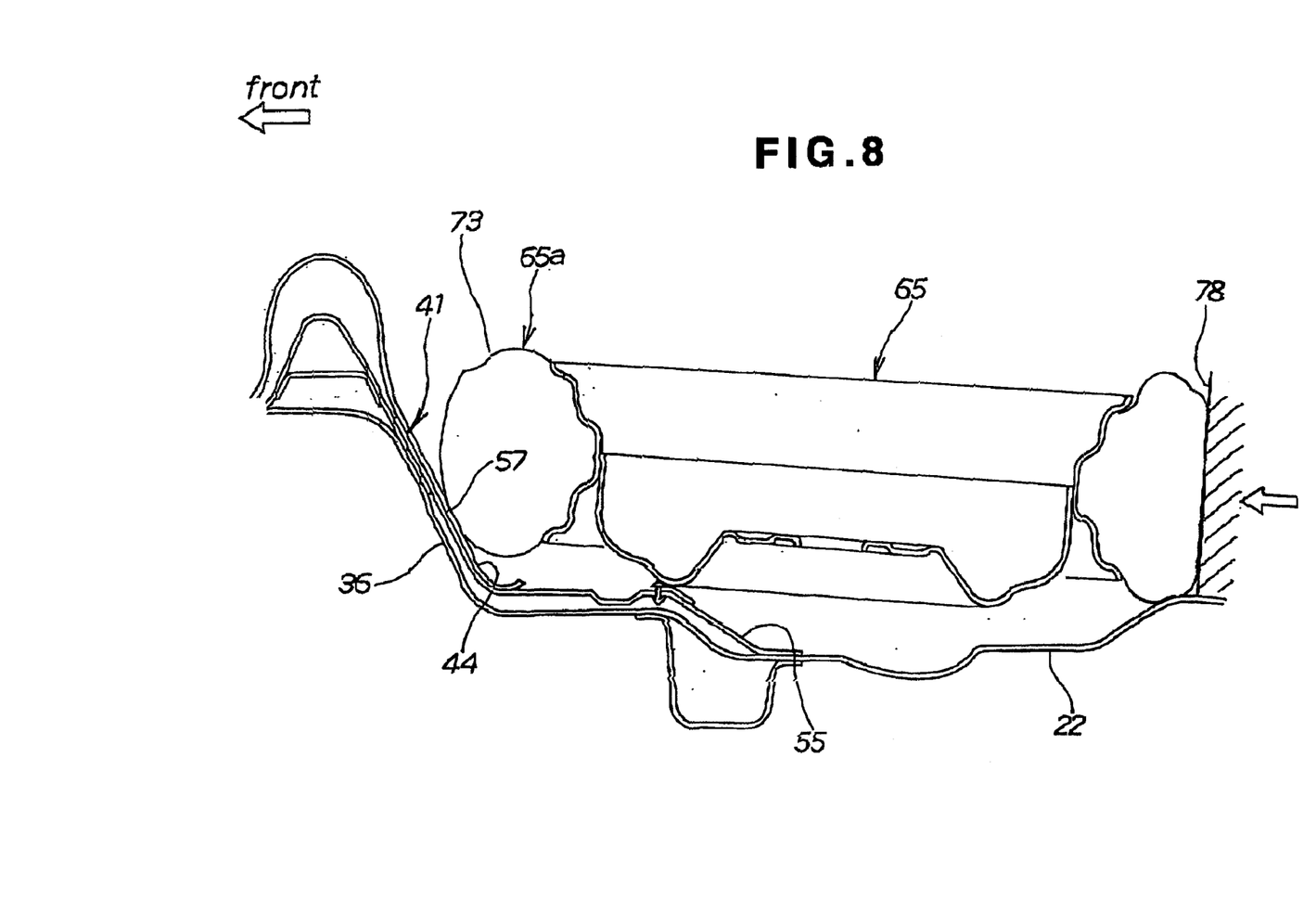

Under conditions shown in FIGS. 7 and 8, the wheel 68 of the spare tire 65 reaches an upper area of the first inclined portion 55. When this takes place, the tire 73 remains in a condition where the same is held in abutting engagement with the second inclined portion 57 of the front wall reinforcing member 41 via the floor carpet 44 and, in such a condition, the spare tire 65 is further raised together with the floor carpet 44 along the second inclined portion 57.

Since the front wall 36 is reinforced with the front wall reinforcing member 41, even when the pressing force is exerted to the front wall 36 from the spare tire 65, it is possible for the deformation of the frontwall 36 to be limited. Accordingly, the spare tire 65 moves along the front wall 36 in a reliable and smooth manner.

Figure 9:
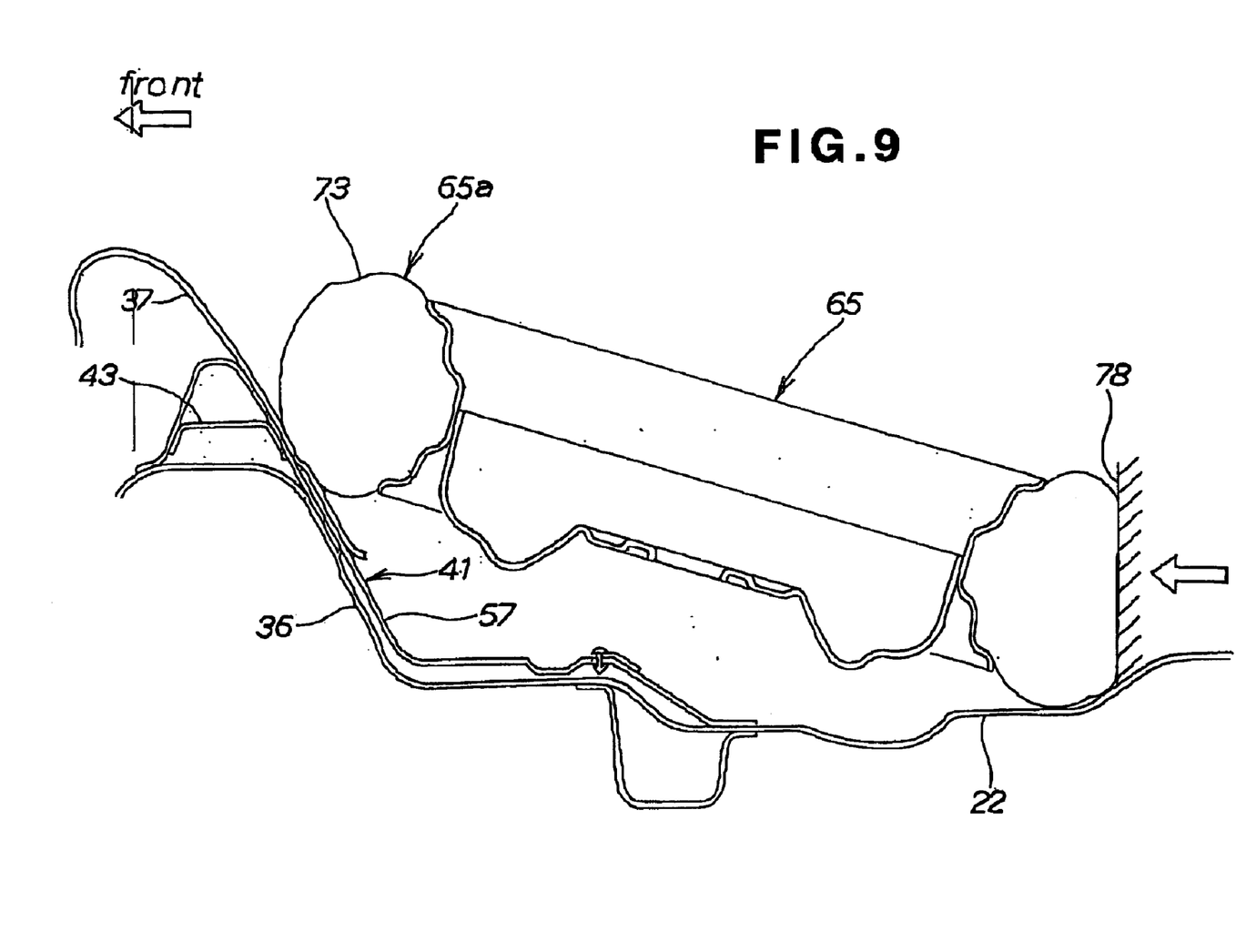

As the spare tire 65 further moves forward of the vehicle body and upward from the condition shown in FIG. 8, as shown in FIG. 9, the front portion 65*a* of the spare tire 65 reaches a side area of the rear floor upper cross member 37. When this occurs, although the pressing force acts on the rear floor upper cross member 37 from the spare tire 65, the presence of the reinforcement 43 provided in the rear floor upper cross member 37 enables the deformation of the rear floor upper cross member 37 to be limited and the spare tire 65 to continuously move upward in a smooth fashion.

As set forth above with reference to FIGS. 2 and 5, the present invention firstly concerns a feature in the vehicle rear body structure wherein the bottom portion 38, which is the spare tire resting floor, is designed to be lower than the flat portion 77 (see FIG. 5) which is the floor closer to the vehicle compartment, with the flat portion 77 and the bottom portion 38 being mutually connected to one another with the front wall 36 sloping downward in the rearward direction, and the fuel tank 76 being located in the area below the front wall 36 and below the flat portion 77 whereby, if the spare tire 65 moves forward, the spare tire 65 is guided to the upper area of the front wall 36 due to the action of the front wall 36, in that the front wall reinforcing member 41 is placed on the front wall 36 to reinforce the same while compelling the front wall reinforcing member 41 to guide the spare tire 65 to the front wall 36.

Guiding the spare tire 65 to the front wall 36 with the front wall reinforcing member 41 enables the spare tire 65 to be smoothly guided to the front wall 36. Further, reinforcing the front wall 36 with the front wall reinforcing member 41 provides a capability of limiting the front wall 36 from being deformed when the spare tire 65 is brought into abutting contact with the front wall 36 via the front wall reinforcing member 41 and the floor carpet 44. As a consequence, the spare tire 65 is enabled to reliably move to the upper area of the front wall 36 due to the inclination of the front wall 36 while enabling the clearance C2 between the fuel tank 76 and the front wall 36 to be reduced. That is, the clearance C2 of the present invention can be reduced to a lower value than the clearance C1 between the conventional fuel tank and the front wall. Accordingly, the fuel tank 76 may have a larger capacity than that of the conventional fuel tank.

Further, since the front wall reinforcing member 41 is bridged between the rear floor upper cross member 37 and the rear floor cross member 45 (i.e. the front wall reinforcing member 41 is bridged to the rear floor upper cross member 45 via rear floor panel 22), the front wall reinforcing member 41 is located on a highly rigid area of the rear floor panel 22 such that, even when the spare tire is brought into abutting engagement with the second inclined portion 57 of the front wall reinforcing member 41, there is no fear of deviation of an entire part of the front wall reinforcing member 41 due to deformation of the rear floor panel 22.

Secondly, the present invention concerns a feature in that the floor carpet 44 is provided between the front wall reinforcing member 41 and the spare tire 65 and has the lower coefficient of friction with respect to the front wall reinforcing member 41 than that with respect to the tire portion 73 of the spare tire 65.

Under a condition where the spare tire 65 is disposed on the floor carpet 44, the spare tire 65 tends to easily slide on the front wall reinforcing member 41, enabling the spare tire 65 to move in a further smooth fashion.

Thirdly, the present invention concerns a feature in that the flat portion 77 is additionally provided with the rear floor upper cross member 37 which in turn contains the reinforcement 43.

The presence of the flat portion 77 additionally provided with the rear floor upper cross member 37 and the reinforcement 43 contained in the rear floor upper cross member 37 provides a capability of limiting the rear floor upper cross member 37 from being deformed when the spare tire 65 is brought into abutting engagement with the rear floor upper cross member 37 via the floor carpet 44. As a result, the spare tire 65 is smoothly moved without being interrupted with the rear floor upper cross member 37.

The sheet-like member is not limited to the floor carpet and may include, for example, a sheet made of plastic resin (for instance, fluorocarbon polymers such as ethylene tetra fluoride resin, etc.), and a sheet made of fabric (for instance, silk, flax or chemical fibers)

According to the present invention, as set forth above, since the slanted surface is placed with and reinforced with the reinforcing inclined plate while permitting the reinforcing inclined plate to guide the spare tire toward the slanted surface, the spare tire is enabled to be smoothly guided to the slanted surface. Further, reinforcing the slanted surface with the reinforcing slanted plate enables deformation of the slanted surface to be limited when the spare tire is brought into abutting engagement with the slanted surface and, hence, it is possible for the spare tire to reliably move to the upper area of the slanted surface along the inclination of the slanted surface while enabling reduction in a distance between the fuel tank and the slanted surface. Consequently, the fuel tank can be designed to have an increased volume.

Further, since the vehicle rear body structure according to the present invention is structured to have the sheet-like member, provided between the reinforcing inclined plate and the spare tire, which has the lower coefficient of friction with respect to the reinforcing inclined plate than that with respect to the tire portion of the spare tire, the spare tire is easy to slide on the reinforcing slanted plate under a condition where the spare tire is placed on the sheet-like member, enabling the spare tire to be further smoothly moved.

Furthermore, since the vehicle rear body structure according to the present invention is structured to have the cross member which is additionally provided on the floor closer to the vehicle compartment while compelling the cross member to contain the reinforcing member, it is possible to limit deformation of the cross member that would otherwise occur when the spare tire is brought into abutting engagement with the cross member, resulting in a capability of smoothly moving the spare tire without being interrupted with the cross member.

The present disclosure relates to the subject matter of Japanese Patent Application No. 2001-177648, filed Jun. 12, 2001, the disclosure of which is incorporated herein by reference in its entirety.

What is claimed is:

1. A vehicle rear body structure for accommodating a spare tire, comprising:

a floor nearest to a passenger compartment;

a spare tire resting floor lowered in height than the nearest-to-the-compartment floor for resting a spare tire thereon;

a slanted surface interconnecting said floors and sloped downwardly and rearwardly; and a reinforcing inclined plate mounted to the slanted surface for reinforcing the slanted surface, the reinforcing inclined plate including a first inclined portion and a second inclined portion adapted for engagement with a wheel and a tire, respectively, of the spare tire, the first inclined portion being rearward of the second inclined portion, the first and second inclined portions being arranged such that, when the spare tire is moved forward, the first inclined portion engages the wheel of the spare tire and guides the spare tire forwardly while raising a front portion of the spare tire before engagement occurs between the second inclined portion and the tire of the spare tire.

2. A vehicle rear body structure according to claim 1, further including a cross member of a hollow cross-sectional shape disposed on the nearest-to-the-compartment floor adjacent an upper end of the slanted surface, and a reinforcement disposed inside the hollow cross member to reinforce the cross member.

3. A vehicle rear body structure for accommodating a spare tire, comprising:

a floor nearest to a passenger compartment;

a spare tire resting floor lowered in height than the nearest-to-the-compartment floor for resting a spare tire thereon;

a slanted surface interconnecting said floors and sloped downwardly and rearwardly; and a reinforcing inclined plate mounted to the slanted surface for reinforcing the slanted surface, so that when said spare tire is moved forward, said spare tire is guided by the reinforcing inclined plate toward an upper area of said slanted surface, wherein a sheet-shaped member is positioned between said reinforcing inclined plate and said spare tire, and a coefficient of friction occurring between the sheet-shaped member and said reinforcing inclined plate is smaller than that occurring between a tire portion of said spare tire and said sheet-shaped member.

4. A vehicle rear body structure according to claim 3, wherein a cross member is additionally provided on the nearest-to-the-compartment floor, and the cross member includes a reinforcement.

5. A vehicle rear body structure according to claim 3, further including a cross member of a hollow cross-sectional shape disposed on the nearest-to-the-compartment floor adjacent an upper end of the second inclined portion of the reinforcing inclined plate, and a reinforcement disposed inside the hollow cross member to reinforce the cross member.

* * * * *